April 22, 1930.  H. S. GOLDEN  1,755,987
HEADLAMP SUPPORT
Filed Jan. 4, 1929
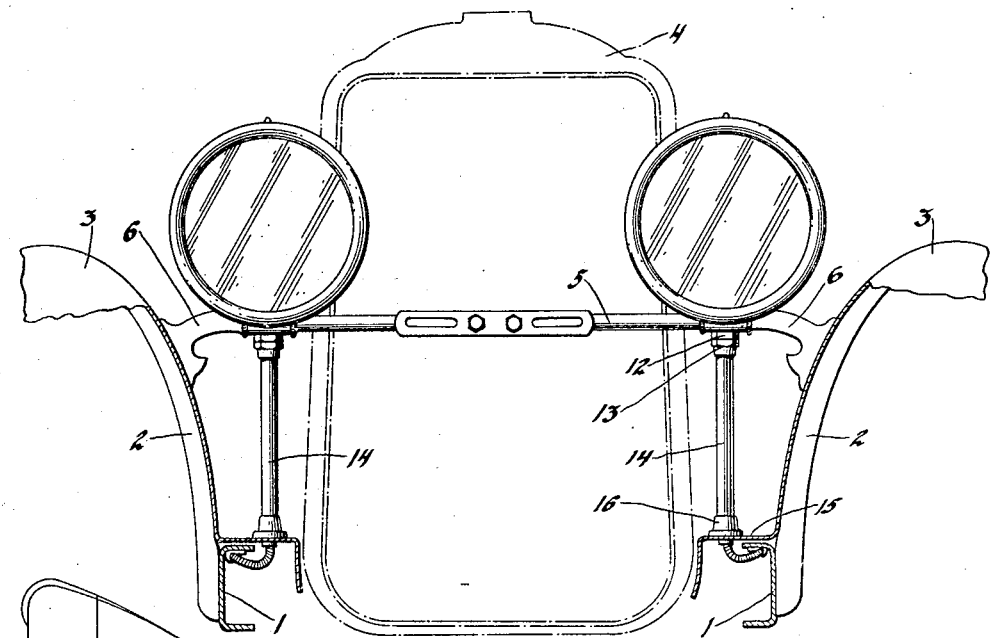
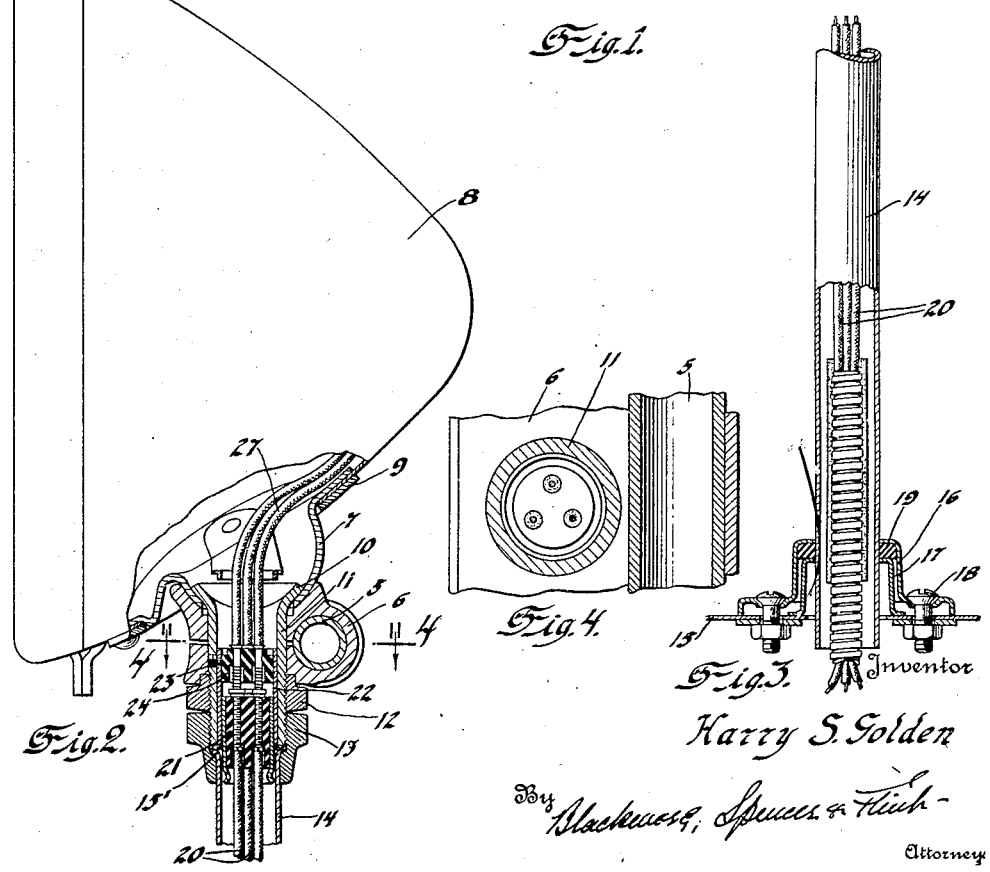
Inventor
Harry S. Golden
By Blackness, Spencer & Finch
Attorney Patented Apr. 22, 1930

1,755,987

UNITED STATES PATENT OFFICE

HARRY S. GOLDEN, OF FLINT, MICHIGAN, ASSIGNOR TO GENERAL MOTORS CORPORATION, OF DETROIT, MICHIGAN, A CORPORATION OF DELAWARE

HEAD-LAMP SUPPORT

Application filed January 4, 1929. Serial No. 330,249.

This invention relates to headlamp mountings for motor vehicles, of the general type wherein a pair of lamps are supported on a fender brace and a vertical post leading upwardly to each lamp is employed to conceal the current conducting wires and to also lend a certain ornamental appearance to the front end of the vehicle.

It is an object of the invention to provide an improved mounting, whereby a headlamp may be readily attached to the support and adjusted to its proper position, and wherein the ornamental post in which the wires may be concealed can be independently and detachably connected with an attachment portion of the lamp.

Additional objects and advantages will be apparent from the following specification when taken in connection with the accompanying drawing, wherein Fig. 1 is a front elevation of a lamp mounting, embodying the present invention. Fig. 2 is a transverse sectional view of the fastening attachment for the lamp. Fig. 3 is a view, partly in section, illustrating the manner of mounting the lower portion of the vertical post, and Fig. 4 is a section taken on line 4—4 of Fig. 2.

Referring to the preferred, but not necessarily the only embodiment of the invention as illustrated in the drawing, the numeral 1 indicates a chassis frame from each side of which extends upwardly and outwardly a bracket 2 for supporting the mud guard or fender 3. Extending transversely of the vehicle and forward of the radiator 4 is a tie-rod 5, secured at opposite ends in brackets 6 which are connected to the fender brackets 2, in order to brace the fenders from each other. The inner end of each bracket 6 is split, and has an opening into which the end of the tie-rod 5 extends, the rod being clamped in place by the contraction of the split ends, as will be later pointed out.

On the upper face of the bracket 6, there is provided a concave recess to which is positioned a hollow parti-spherical member 7, having an annular marginal flange riveted or otherwise secured on the inside of the lamp housing 8. On the outside of the lamp housing, and opposite the marginal flange of the part 7, is an annular reenforcing plate or ring 9, through which the fastening rivets pass. The edges of the lamp housing are thus held between the flange and ring, and are firmly clamped therebetween, to reduce the strain on and prevent crystallization and cracking of the thin wall of the lamp housing. Within the member 7, is an outwardly flared or flanged portion 10, of a tube 11, which extends through an opening in the bracket 6 and has its lower end screw threaded for the engagement thereon of a nut 12, to draw the tube downwardly and clamp the member 7 between the flange 10 and concave seat or socket, and to contract the split portion of the bracket 6 about end of the tie-rod 5. This fastening for the lamp affords a sort of universal mounting, whereby the lamp housing may be securely held in a proper position of adjustment to obtain a desired lighting effect so far as direction of light rays is concerned.

Also screw threaded on the end of the tube 11, is a nut 13, having a dependent extension of reduced interior diameter into which extends the upper end of a substantially vertical conduit or post 14, whose upper end is flared outwardly as at 15′, to seat against the shoulder formed by the reduced extension of the nut. The lower end of the post or tube 14 projects through the hood ledge 15 and is held in place by means of a pair of stampings 16 and 17, secured by screws or bolts 18 to the hood ledge 15 and clamping therebetween, a packing ring or sleeve 19 of rubber or other similar material, which surrounds the tube and cushions it against rattle, while permitting its sliding movement therethrough. The upwardly extending tube 14 serves to conceal the current conducting wires 20 leading to the lamp bulbs. These wires are preferably connected with a detachable plug 21, having a bayonet slot or other suitable connection with a sleeve 22, held in the end of the tube 11 by set screw 23, and carrying an insulator body 24 in which is positioned the terminals on the ends of the wires 27 leading into the interior of the lamp housing to the lamp sockets.

From the above description it will be apparent that access for inspection and repair to the current conducting wires concealed within the post and the quick detachable connector plug may readily and conveniently be had by simply unthreading the nut 13 and sliding the post 14 downwardly in the packing ring 19, without disturbing the mounting of the lamp and its adjustment. From the standpoint of appearance the construction is intended to afford a certain amount of distinction to the front end of the vehicle and eliminate the drab head-on appearance so common heretofore in motor vehicle design. A pleasing contrast may be had by giving the vertical posts a bright finish and painting the fender brace a dark or dull color, whereby the effect of a lamp supported on a single slender post is had.

While the invention has been described in terms more or less specific, it will be understood that only a preferred embodiment has been shown, and that such modifications can be made as come within the scope of the appended claims.

I claim:

1. In a motor vehicle, the combination with a fender brace, a lamp having a hollow tubular portion projecting through the fender brace and a fastening nut threaded on said tubular portion to hold the lamp in position, of a conduit for concealing the conductor of energy for lighting the lamp and means for detachably connecting said conduit in alignment with said tubular portion independently of said fastening nut for the lamp, whereby the conduit may be removed without disturbing the adjustment of said lamp.

2. In a motor vehicle, or the like, the combination with a support and a lamp to be mounted on said support, of a hollow conduit on the lamp leading to the interior thereof, a second conduit detachably connected in alignment with the first conduit, current conductors for the lamp leading through and concealed within said conduits and means connecting the conduits independently of the lamp mounting whereby said conduits may be connected and disconnected from each other without disturbing the lamp mounting.

3. The combination with a support and a lamp, of means to fasten the lamp on the support, a vertical post extending upwardly toward the lamp and a detachable connection between the lamp and said post which is independent of said fastening means, whereby the post may be connected and disconnected without disturbing said lamp fastening means.

4. The combination with a support and a lamp, of a dependent projection on the lamp extending through the support, means to hold the projection against removal, a vertical post extending toward the lamp and means connecting said post to the projection independently of said first mentioned means.

5. The combination with a support and a lamp, of a hollow tube on the lamp adapted for projection through the support, fastening means engaging the tube to hold the lamp in its proper position of adjustment, a post extending in a substantially vertical position toward the lamp and means to detachably fasten the tube and post with each other and in a manner to permit the post and tube to be connected and disconnected without disturbing the position of the lamp.

6. The combination with a support and a lamp, of a hollow tube on the lamp adapted for projection through the support, a nut screw threaded on the tube for engagement with the support to hold the lamp in adjusted position, a hollow post extending substantially vertically toward the lamp, means to fasten said tube and post end to end in alignment with each other so as to permit their connection and disconnection without disturbing the relation of the lamp and its support, and a current conductor concealed within the post and tube and leading to the lamp to be lighted.

7. The combination with a support and a lamp, of a hollow tube on the lamp adapted for projection through the support, a nut screw threaded on the tube for engagement with the support to hold the lamp in adjusted position, a hollow post extending substantially vertically toward the lamp, means to fasten said tube and post end to end in alignment with each other so as to permit their connection and disconnection without disturbing the relation of the lamp and its support, current conducting wires concealed within the tube and post, and a pair of detachable connector plugs associated with said wires, one of which is fixed adjacent the end of said tube, whereby said plugs are easily accessible upon disconnection of said fastening means.

In testimony whereof I affix my signature.

HARRY S. GOLDEN.